(12) United States Patent
Thiel et al.

(10) Patent No.: US 10,761,994 B2
(45) Date of Patent: *Sep. 1, 2020

(54) STORAGE OF DATABASE COLUMN DATA IN NON-VOLATILE MEMORY

(71) Applicant: SAP SE, Walldorf (DE)

(72) Inventors: Carsten Thiel, Heidelberg (DE); Guenter Radestock, Karlsruhe (DE)

(73) Assignee: SAP SE, Walldorf (DE)

( * ) Notice: Subject to any disclaimer, the term of this patent is extended or adjusted under 35 U.S.C. 154(b) by 58 days.

This patent is subject to a terminal disclaimer.

(21) Appl. No.: 16/197,803

(22) Filed: Nov. 21, 2018

(65) Prior Publication Data
US 2019/0347206 A1 Nov. 14, 2019

(30) Foreign Application Priority Data
May 10, 2018 (IN) .............................. 201811017604

(51) Int. Cl.
| | |
|---|---|
| *G06F 12/10* | (2016.01) |
| *G06F 12/02* | (2006.01) |
| *G06F 16/22* | (2019.01) |
| *G06F 12/06* | (2006.01) |
| *G06F 3/06* | (2006.01) |

(52) U.S. Cl.
CPC .............. *G06F 12/10* (2013.01); *G06F 3/064* (2013.01); *G06F 3/067* (2013.01); *G06F 3/0607* (2013.01); *G06F 3/0631* (2013.01); *G06F 12/0223* (2013.01); *G06F 12/0246* (2013.01); *G06F 12/0646* (2013.01); *G06F 16/221* (2019.01); *G06F 2212/1008* (2013.01); *G06F 2212/163* (2013.01); *G06F 2212/205* (2013.01); *G06F 2212/657* (2013.01); *G06F 2212/7202* (2013.01)

(58) Field of Classification Search
CPC .................................. G06F 12/10; G06F 12/02
See application file for complete search history.

(56) References Cited

U.S. PATENT DOCUMENTS

| | | | |
|---|---|---|---|
| 9,195,657 B2 * | 11/2015 | Oks .......................... | G06F 16/00 |
| 2008/0162782 A1 * | 7/2008 | Suresh ................. | G06F 12/0246 711/103 |
| 2017/0153850 A1 * | 6/2017 | Li ........................... | G06F 12/08 |

* cited by examiner

*Primary Examiner* — David E Martinez
(74) *Attorney, Agent, or Firm* — Buckley, Maschoff & Talwalkar LLC

(57) ABSTRACT

A system in which first header data and a first logical array are stored in a volatile random access memory, the first logical array stored in a first contiguous memory block, with each array position of the first logical array representing a position in a database table and storing a value identifier of a value associated with the position in the database table, and with the first header data indicating a number of bits used to encode the value identifiers and comprising a first pointer to the first contiguous memory block. A memory size associated with the first header data and the first contiguous memory block is determined, a first memory block of the non-volatile random access memory is allocated based on the determined memory size, an address of the non-volatile random access memory associated with the allocated first memory block is determined, and the number of bits and a binary copy of the first contiguous memory block are written at the address of the non-volatile random access memory.

16 Claims, 7 Drawing Sheets

STORAGE OF DATABASE COLUMN DATA IN NON-VOLATILE MEMORY

CROSS-REFERENCE TO RELATED APPLICATIONS

This application is related to, and claims benefit of and priority to, Indian Provisional Patent Application No. 201811017604, filed May 10, 2018, the contents of which are hereby incorporated by reference in their entirety for all purposes.

BACKGROUND

Non-Volatile Memory (NVM) provides an intermediate alternative between high-performance Dynamic Random Access Memory (DRAM) and cost-effective hard disk drives (HDDs). Generally, the read performance of NVM is similar to DRAM and the write performance of NVM is significantly faster than HDDs. Moreover, NVM is byte-addressable and writes to NVM are durable, so data stored therein may be accessed directly after a crash and restart, as opposed to reloading such data from HDD into DRAM.

Traditionally, data is stored in DRAM in a tree format including a root node and leaves, with DRAM pointers to downstream leaves. To persist the data, the data is written to HDD in the same format. Specifically, the root node and leaves are written into a persistence file as separate binary chunks, with their pointers mapped to account for offsets of bunches of leaves which point to the start of a new data block. A similar persistence format may be used to persist the data in NVM. As a result of this persistence format, the time required to load persisted data from NVM into DRAM is dependent on the volume of persisted data. Also, the storage of pointers in NVM can be problematic since the same data may not be assigned a same address each time it is mapped to virtual space.

NVM has been considered as a medium to persist database tables. In some implementations, each database table partition includes a delta column fragment and a main column fragment for each of its table columns. A main column fragment may include a column vector, a dictionary and optional data structures such as an index from dictionary value IDs to positions of the column vector storing each ID. It is desirable to persist main column fragments in and load main column fragments from NVM while addressing the shortcomings of conventional persistence methods.

DETAILED DESCRIPTION

According to some embodiments, in-memory data is written to NVM such that, during load, the data (and any sub-structures) are mapped to an in-memory virtual address space such that the data (and any sub-structures) may be accessed directly via the virtual address space. Some embodiments include an alignment gap when writing to NVM to ensure the persisted data is aligned (e.g., 64-bit aligned), thereby facilitating in-memory manipulation of the data.

Some embodiments provide writing of data to NVM in larger binary data blocks than in prior persistence formats. Embodiments may also or alternatively write offsets to sub-positions at the beginning of the binary data blocks to facilitate calculation of pointers to sub-parts of the data block during deserialization. Advantageously, such offsets avoid a need to persist pointers within NVM.

Loading of persisted data blocks into DRAM may therefore include mapping to a virtual memory space and pointer reconstruction. The persisted data blocks may then be accessed directly from the virtual memory space, and in an aligned format particularly suitable for access by conventional memory algorithms.

As mentioned above, a main column fragment may include a column vector, a dictionary and optional data structures such as an index from dictionary value IDs to positions of the column vector storing each ID. In some embodiments, a main column fragment may be persisted in NVM as one memory block consisting of each of these sub-structures, written sequentially to NVM with one entry point to the main column fragment.

Figure 1:
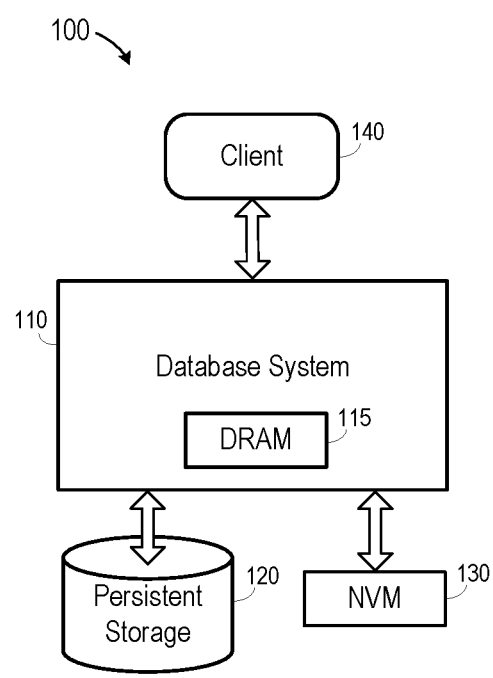
FIG. 1 is a block diagram of a system according to some embodiments.

FIG. 1 is a block diagram of system 100 according to some embodiments. System 100 includes database system 110, persistent storage 120, NVM 130, and client 140. According to some embodiments, database system 110, persistent storage 120 and NVM 130 may operate to serve transactional and analytical data to client 140 based on requests received therefrom.

Database system 110 may comprise any query-responsive database system that is or becomes known, including but not limited to a structured-query language (i.e., SQL) relational database management system. Database system 110 generally provides data to reporting clients, such as client 120, in response to instructions (e.g., SQL statements) received therefrom. In some embodiments, database system 110 receives an instruction from client 120. Database system 110 generates a statement execution plan based on the instruction and on stored metadata describing the data of the database. The statement execution plan is forwarded to storage layer of database system 110, which executes the plan and returns a corresponding dataset. Database system 110 then returns the dataset to client 120. Embodiments are not limited thereto.

Database system 110 may comprise an "in-memory" database, in which DRAM 115 is used for cache memory and for storing the full database during operation. According to some embodiments, DRAM 115 may be used to store portions of the full database while NVM 130 is used to store other portions of the full database. As mentioned above, the portions stored by NVM 130 are persisted and therefore need not be reloaded after a database or server restart.

In some embodiments, the data of database system 110 may comprise one or more of conventional tabular data, row-based data stored in row format, column-based data stored in columnar format, and object-based data. Moreover, the data of database system 110 may be indexed and/or selectively replicated in an index to allow fast searching and retrieval thereof.

Persistent storage 120 may comprise one or more non-volatile data storage units (e.g., fixed disks) storing a relational database, a multi-dimensional database, an eXtendable Markup Language (i.e., XML) document, or any other structured and/or unstructured data. Persistent storage 120 may also store log volumes, data backups, and/or other suitable data. The data of persistent storage 120 may be distributed among several non-volatile data storage units. Embodiments are not limited to any number or types of non-volatile data storage units.

NVM 130 may be implemented using flash-based memory connected to a processor vie PCIe interconnect technology, but other variants are known, including but not limited to 3D XPoint, Phase-change Random Access Memory, Magnetic Random Access Memory, and Memristors. NVM 130 may exhibit a Dual In-Line Memory Module (i.e., DIMM) form-factor and may therefore interface with a Central Processing Unit (i.e., CPU) of database system 110 as RAM (e.g., byte-addressable, directly accessible using load/store instructions, and covered by CPU cache-line handling, including cross-socket cache coherency) rather than as a block device. According to some implementations, the device latency of NVM 130 is close to that of DRAM 115 and its bandwidth lower than that of DRAM 115.

Client 120 may comprise one or more devices executing program code of a software application for presenting user interfaces to allow interaction with data server 130. Presentation of a user interface may comprise any degree or type of rendering, depending on the type of user interface code generated by database system 110. For example, client 120 may execute a Web Browser to receive a Web page (e.g., in HTML format) from database system 110, and may render and present the Web page according to known protocols. Client 120 may also or alternatively present user interfaces by executing a standalone executable file (e.g., an .exe file) or code (e.g., a JAVA applet) within a virtual machine.

Although embodiments are described with respect to system 110, which reflects "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. System 110 may also or alternatively support multi-tenancy by providing multiple logical database systems which are programmatically isolated from one another.

Data structures are commonly created and populated in memory, and once populated, data structures may be persisted on disk. Once persisted on disk, a data structure can be destroyed from memory when not needed. Then, if the data structure is again needed in memory at a future time, the data structure can be reconstructed from the information persisted on disk. "Loading" a data structure refers to the reconstruction of a data structure in memory from the information persisted on disk. The representation of the data structure on disk may not match the representation in memory, but the information stored on disk is sufficient to allow full reconstruction of the data structure in memory.

Figure 2:
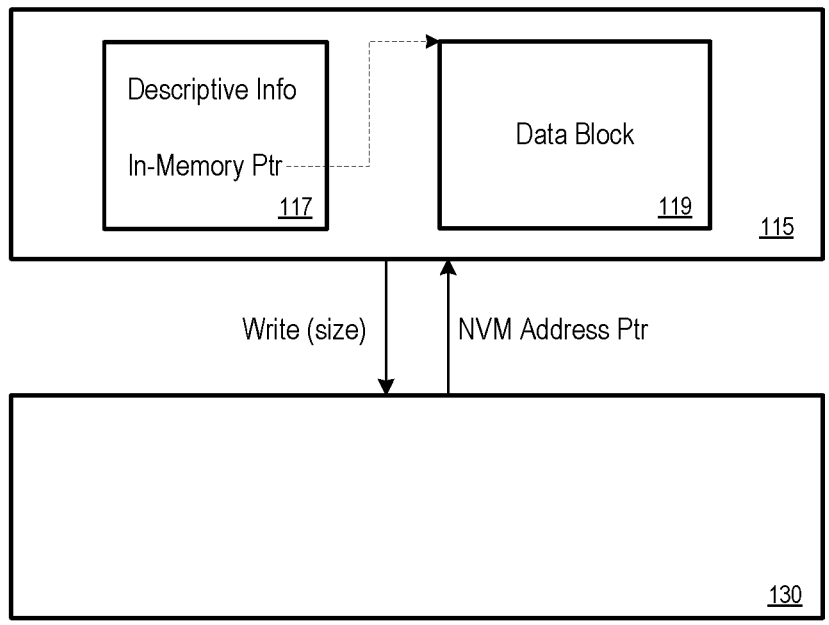
FIG. 2 illustrates an in-memory data representation according to some embodiments.

FIG. 2 illustrates data residing in DRAM 115 according to some embodiments. The data includes header 117 and data block 119. Header 117 includes descriptive information regarding data block 119 and a pointer to data block 119. Although data block 119 (and each other DRAM data block described herein) is depicted as a contiguous element, data block 119 (and each other data block) may consist of many chunks of data stored at non-contiguous memory addresses of DRAM 115. For example, data block 119 may comprise as a linked tree-like structure of leaves, where the data of each leaf is stored at an allocated address space which is independent of address spaces at which other leaves are stored.

FIG. 2 also illustrates an instruction to write data block 119 to NVM 130. The write instruction may pass the size of the data block to NVM 130. According to some embodiments, a memory block is allocated in NVM 130 based on the size, and a pointer to an address of NVM 130 is returned. The data is then written to NVM 130 at the address as shown in FIG. 3.

Before creating block 135 in NVM 130, a "dry run" of the serialization may be executed to determine the required size of block. According to some embodiments, writing of the data includes adding alignment bits to blocks of memory which are to be aligned in the virtual address space of DRAM 115 upon re-loading of the data. The dry run therefore sums up the size of all data elements including alignment bits, but does not copy any data. Consequently, fragmentation is reduced as is any need to move the memory block to a different location after serialization.

Figure 3:
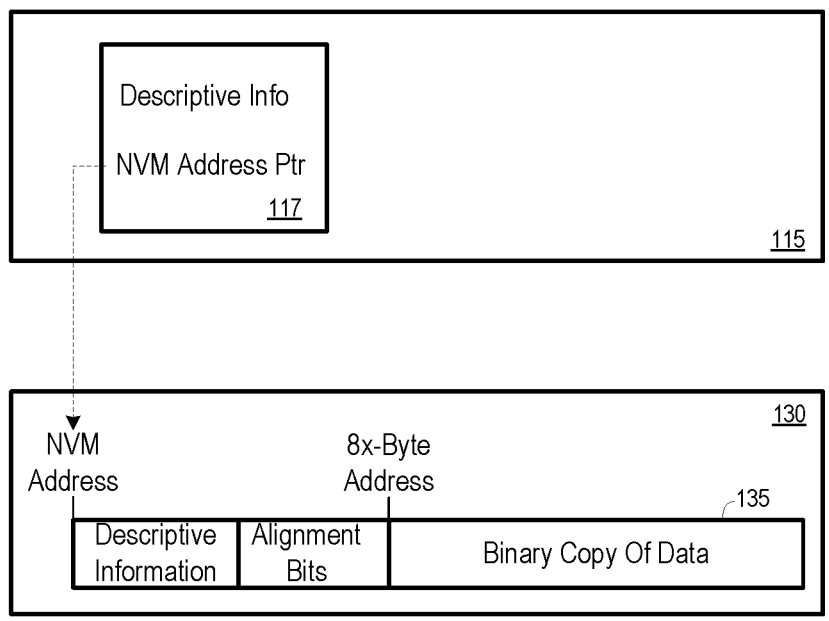
FIG. 3 illustrates writing in-memory data to non-volatile memory according to some embodiments.

As shown in FIG. 3, memory block 135 includes contiguous descriptive information, alignment bits and a binary copy of the data to be persisted. The descriptive information may be identical to, similar to, or completely different from the descriptive information of header 117. According to some embodiments, the descriptive information indicates a size of memory block 135.

The number of alignment bits of memory block 135 are determined such that a start address of the binary copy of data is divisible by 64-bits. As mentioned above, such alignment may be particularly suited to algorithms to be executed on the data. Embodiments are not limited to 64-bit alignment, and may implement any other suitable alignment.

As also illustrated in FIG. 3, only descriptive information and pointers to content data are kept in DRAM 115, with the pointers being switched from DRAM addresses to corresponding addresses of the mapped NVM block 135. Previous DRAM memory used for content data 119 is freed. With NVM block 135 mapped in the virtual address space, the data may be accessed directly from NVM block 135 during all subsequent accesses.

Figure 4:
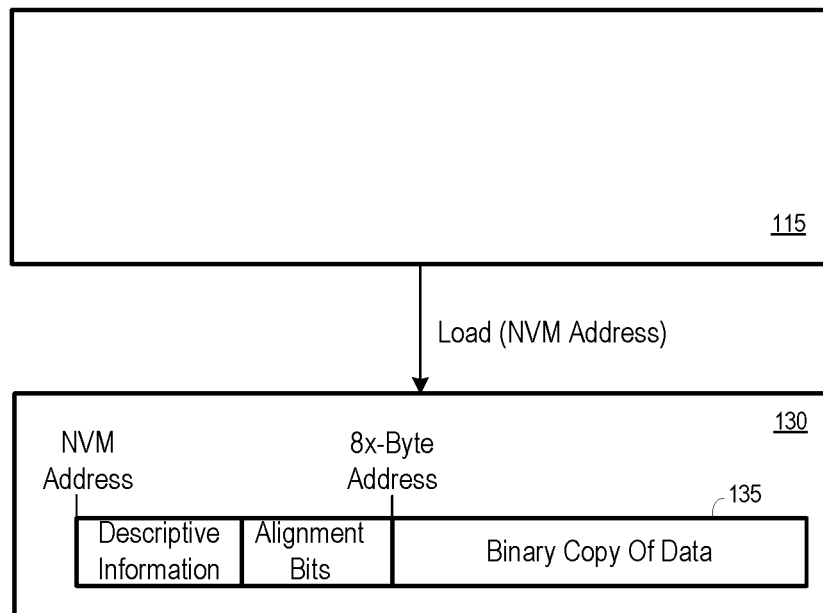
FIGS. 4 and 5 illustrate loading data from non-volatile memory to volatile memory according to some embodiments.
Figure 5:
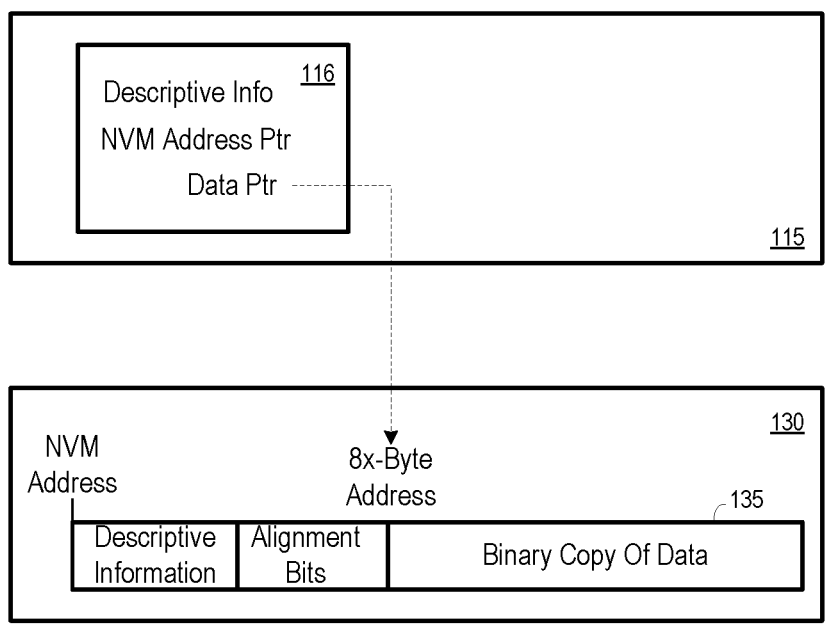

FIGS. 4 and 5 illustrate loading of data previously written into NVM 130 according to some embodiments. It is assumed that no artifacts of the data reside in DRAM 115 (e.g., after a system restart). Loading begins by requesting the data from an NVM address, where the NVM address of a desired block is persisted elsewhere in the system. The block located at the address (e.g., NVM block 135) is deserialized and the descriptive information is copied into header 115 of DRAM 115. Pointers to content data are created in header 116 and are assigned to the corresponding addresses within mapped NVM block 135. The corresponding address in the present example is identified by determining a first 64-bit aligned address following an end of the descriptive information.

FIGS. 2 through 5 may illustrate writing and loading of any type of data to and from NVM. Some embodiments may be used to persist and load structures of database data.

For example, database column data may include a dictionary of values stored in the column, and a column vector of row data which includes, for each row of the column, an id of the dictionary value which is stored in the row. Column data may also include optional additional data structures such as indexes from dictionary value ids to the positions of the column vector which include the id.

Each of these data structures typically consists of some small descriptive data, the size of which is independent of the column size, and content data, which is heavily dependent on the column size. Examples of descriptive data are the number of rows or the number of distinct values of the column. Examples of content data are the content of the column vector, and the list of distinct column values in the dictionary.

FIGS. 2 through 5 will now be described with respect to writing and loading a column vector to/from NVM 130. For example, data block 119 may comprise a logical array with each array position representing a raw position of data in a table. Each data value is a dictionary-encoded value id (e.g., a 32-bit integer). In some embodiments, the value ids consist only of the minimum number of bits n required to encode all values in the dictionary. For example, if the dictionary includes sixty-four distinct values, then each value is 6-bits in length. Data block 119 comprises a contiguous memory, where the first n bits are associated with the first row in the column, the second n bits are associated with the second row in the column, etc. Header 117 may indicate the number of bits used to encode the value ids and the size of data block 119, in addition to the illustrated pointer to the start address of data block 119.

During serialization as depicted in FIG. 3, the number of bits and size are stored as descriptive information in data block 135, followed by a number of alignment bits which result in a next memory address to be 64-bit aligned. A binary copy of data block 119 is stored at this next memory address.

During deserialization as depicted in FIGS. 4 and 5, the descriptive information is copied from the NVM start address into header structure 116 of DRAM 115. A data pointer is determined based on the NVM start address, the length of the descriptive information and on a number of alignment bits needed to reach a next 64-bit aligned memory address in NVM 130. As will be described below, the size of the binary copy as stored in the descriptive information may be used to determine another data pointer in a case that block 135 includes two or more data sub-structures.

Figure 6:
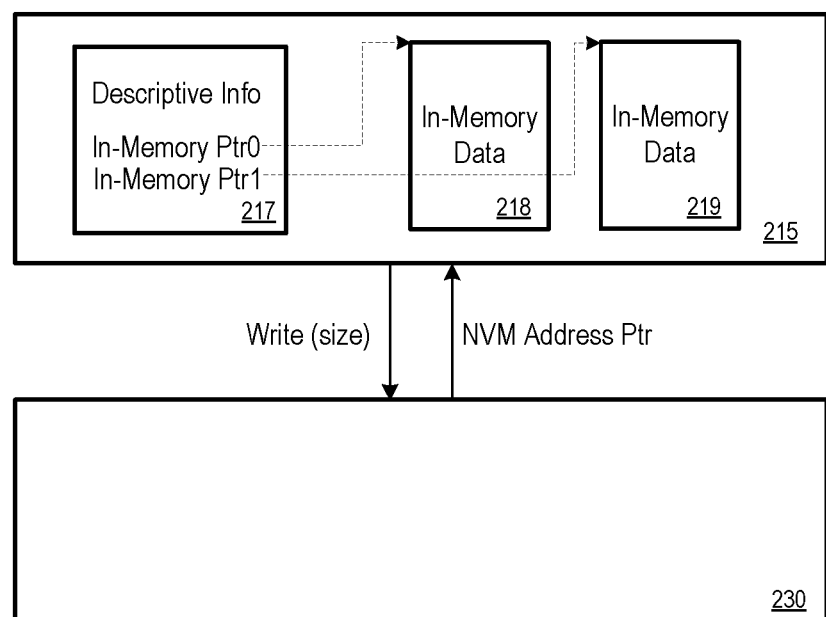
FIG. 6 illustrates an in-memory data representation according to some embodiments.

FIG. 6 illustrates storage of data including sub-structures in DRAM 215. The data includes header 217 and data blocks 218 and 219. Header 217 includes descriptive information regarding data blocks 218 and 219 and a pointer to each of data blocks 218 and 219.

FIG. 6 also illustrates an instruction to write data blocks 218 and 219 to NVM 230. The write instruction may pass the size of the data blocks to NVM 230. According to some embodiments, a memory block is allocated in NVM 230 based on the size, and a pointer to an address of NVM 230 is returned. The pointer is used to serialize data blocks 218 and 219 to the allocated memory block of NVM 230.

Figure 7:
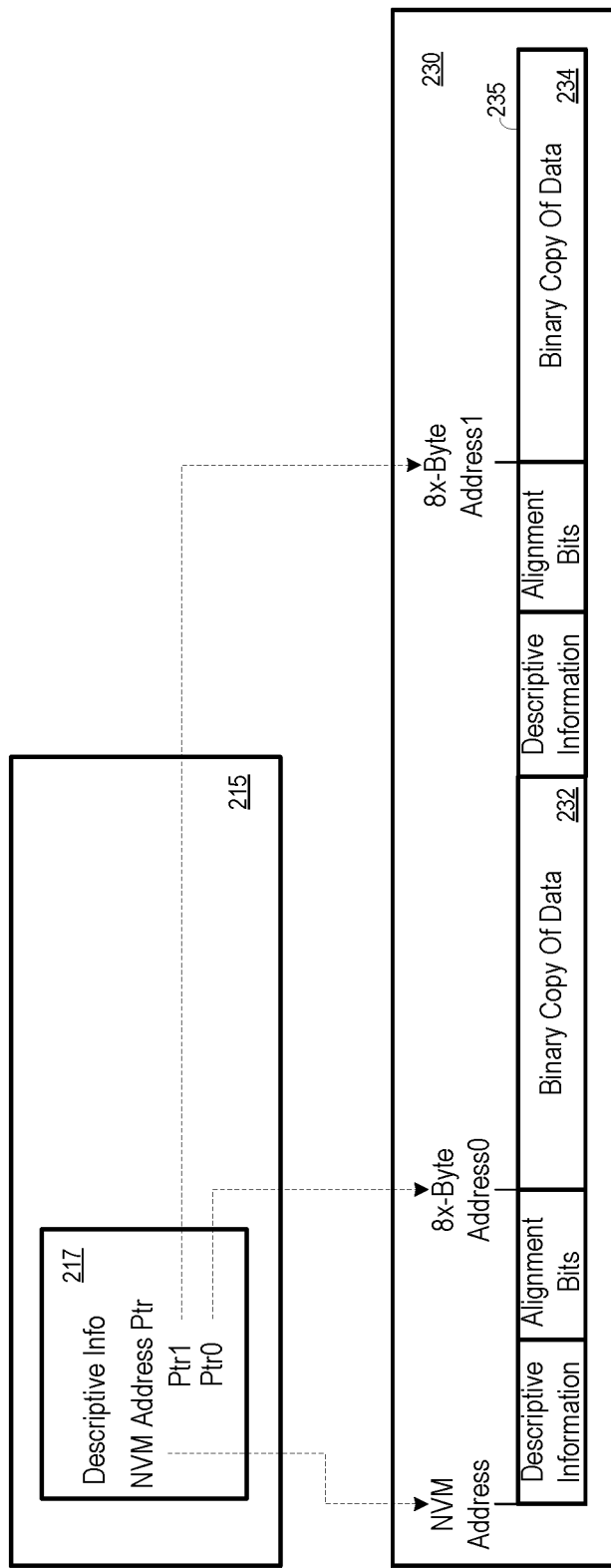
FIG. 7 illustrates writing in-memory data to non-volatile memory according to some embodiments.

As shown in FIG. 7, serialized memory block 235 includes contiguous descriptive information, alignment bits, and binary copy of data 232 corresponding to data block 218, and descriptive information, alignment bits, and binary copy of data 234 corresponding to data block 219.

The number of alignment bits preceding binary copy of data 232 is determined such that a start address of binary copy of data 232 (i.e., 8x-Byte Address0) is divisible by 64-bits. As mentioned above, such alignment may be particularly suited to algorithms to be executed on data 232. Immediately following binary copy of data 232 are the descriptive information, alignment bits, and binary copy of data 234 corresponding to data block 219. As before, the number of alignment bits preceding binary copy of data 234 is determined such that a start address of binary copy of data 234 (i.e., 8x-Byte Address1) is divisible by 64-bits.

As also illustrated in FIG. 7, only descriptive information and pointers to content data are kept in DRAM 215, with the pointers being switched from DRAM addresses to corresponding addresses of the mapped NVM block 235. Previous DRAM memory used for content data 218 and 219 is freed. With the data structures of NVM block 235 mapped in the virtual address space, binary copy of data 232 and binary copy of data 234 may be accessed directly from NVM block 235 during all subsequent accesses.

Figure 8:
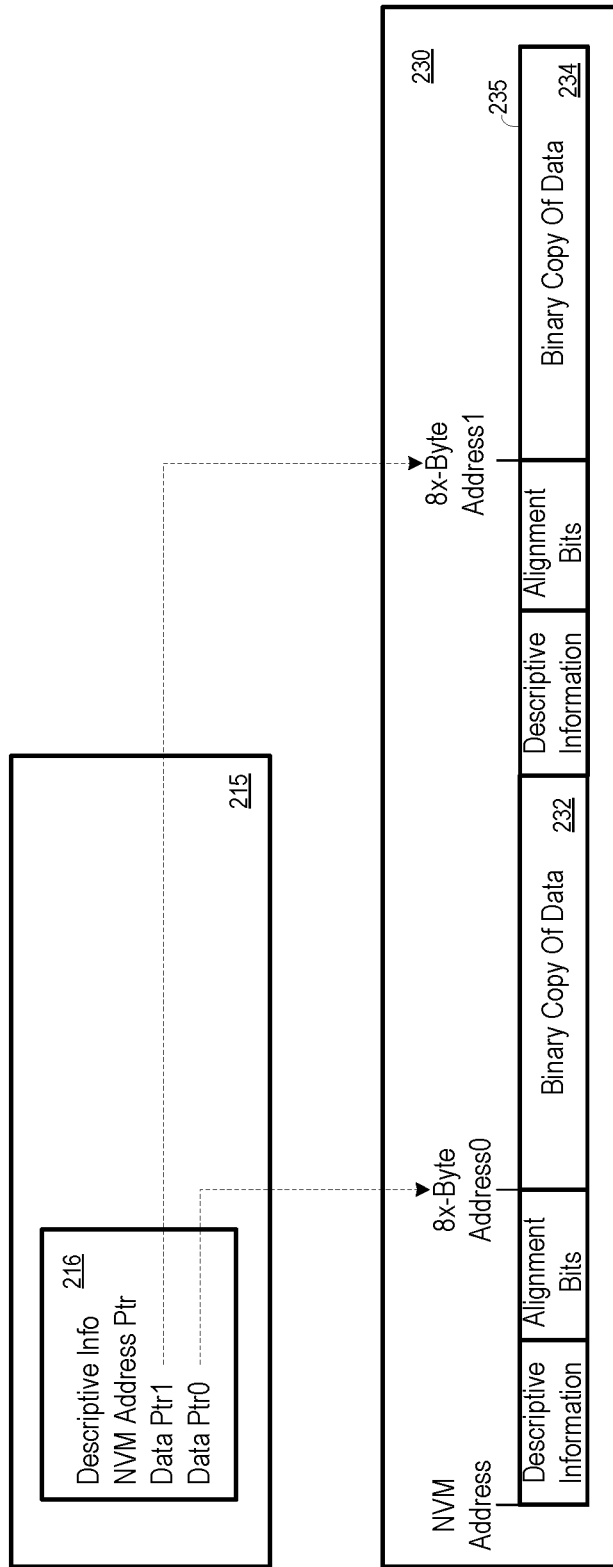
FIG. 8 illustrates loading data from non-volatile memory to volatile memory according to some embodiments.

FIG. 8 illustrates DRAM 215 and NVM 230 after loading of data previously written into NVM 230 as described with respect to FIG. 7. It is assumed that no artifacts of the data resided in DRAM 215 prior to the loading (e.g., after a system restart). Loading begins by requesting the data from an NVM address of a desired block (e.g., of a main column fragment), where the NVM address of the desired block is persisted elsewhere in the system.

The block located at the address (e.g., NVM block 235) is deserialized and the first-encountered descriptive information is copied into header 216 of DRAM 115. A pointer to binary copy 232 (Data Ptr0) is created in header 216 and is assigned to address 8x-Byte Address0 within mapped NVM block 235. The address is identified by determining a first 64-bit aligned address following an end of the descriptive information.

As described above, the descriptive information may indicate a size of the associated content data. This size may be used during loading to determine an offset corresponding to a start address of a next portion of descriptive information (e.g., the descriptive information associated with binary copy 234. Accordingly, the deserialization process continues as described above to create a pointer to binary copy 234 (Data Ptr1) in header 216, identify address 8x-Byte Address1, and assign the pointer to address 8x-Byte Address1.

According to some embodiments, it is determined prior to serialization that one of binary copies 232 or 234 need not be memory-aligned. For example, a data substructure represented by one of binary copies 232 or 234 might not be subjected to processing which would benefit from data alignment. Accordingly, serialization and deserialization of that substructure will not take into account alignment bits as described herein. Such an implementation would not prevent the use of data alignment with respect to other substructures.

In some embodiments, in-memory data 218 comprises a column vector of a main column fragment, and in-memory data 219 comprises a data dictionary. Accordingly, both the column vector and the data dictionary may be serialized into a memory-aligned format and accessed directly from DRAM virtual address space according to some embodiments. Embodiments are not limited to two substructures. For example, in a case that the main column fragment is also associated with an inverted index, the inverted index may be persisted in a contiguous serialized NVM block along with the column vector and the data dictionary as described above, with or without data alignment.

Figure 9:
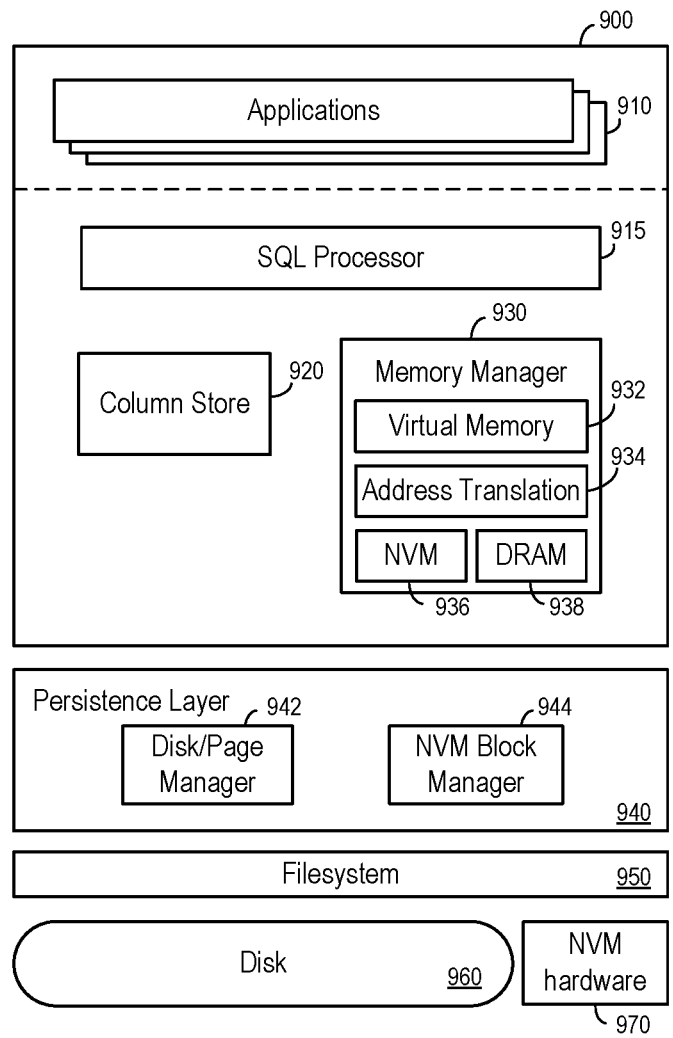
FIG. 9 is a block diagram of a database architecture according to some embodiments.

FIG. 9 is a block diagram of an implementation of database system 110, persistent storage 120 and NVM 130 of FIG. 1. Embodiments are not limited to the illustrated elements of FIG. 9. The illustrated elements may be implemented by any suitable combinations of hardware and software as is known in the art. Such combinations may include one or more processing units (microprocessors, central processing units, microprocessor cores, execution threads), one or more non-transitory storage media, and processor-executable software code.

Each column in a columnar data store may be logically split into a delta fragment and a main fragment. The delta fragment of a column is optimized for read and write access in disk and in memory, while the main column fragment is optimized for read access in disk and memory. According to some embodiments, each main column fragment is associated with an NVM block which stores large memory allocations of the main column fragment. Thus, when a main column fragment is loaded into memory, its large data structures are no longer allocated in DRAM and initialized from disk. Instead, the main column fragment being loaded locates its associated NVM block and points its large data structures directly into the NVM block.

The lifecycle of a main column fragment is driven by delta merges and DDLs. According to some embodiments, and regardless of how it is initiated, the creation of a new main column fragment triggers the creation of a new NVM block and the removal of a main column fragment triggers the removal of its NVM block. Also, if the removal of a main column fragment is undone, the removal of its associated NVM block is undone. Similarly, and according to some embodiments, if the creation of a main column fragment is undone, the creation of its associated NVM block is undone and the NVM block is removed. If the creation of a main column fragment is redone, the creation of its associated NVM block is also redone.

System 900 includes SQL processor 915, which receives SQL statements from one or more client systems as is known in the art (not shown). The SQL statements may include Data Description Language statements (DDLs), queries, and Data Manipulation Language statements. Handling of received queries may require the retrieval of data from column store 920. Column store 920 stores tabular data of a database as is known in the art. DDLs may be handled by creating, deleting or altering a column of column store 920. According to some embodiments, new columns are constructed by column store 920 and persisted to NVM as described herein if appropriate.

Column store 920 uses memory manager 930 to retrieve data from NVM 936 and DRAM 938. According to some embodiments, NVM 936 is used to store column dictionaries and column vector arrays. Each column (or column fragment, representing a partitioned portion of a column) is associated with an NVM block containing its data. In some embodiments, smaller intermediate data structures (e.g., row counts of most-common values, access and usage statistics, bit vector of null values) of columns are allocated in DRAM 938. All delta and MVCC data structures may be allocated in DRAM 938, as are intermediate results of query processing.

For columns associated with an NVM block, column store 920 constructs an NVM block key and uses the key to request a pointer from memory manager 930. Memory manager 930 maps the NVM block into an address of virtual memory 932 via address translation 934. This address is passed back to column store 920, which then points the index vector and dictionary of the in-memory representation of the main column fragment directly into the NVM block.

Memory allocations (including those of the NVM blocks) are mapped to different addresses of virtual memory 932 via address translation 934. NVM blocks are not mapped into virtual memory 932 on restart. As described below, NVM blocks are instead mapped on a first read/write request over them issued by an application.

Persistence layer 940 include disk/page manager 942 to control disk-based filesystem 950 for writing to and reading from data volumes and log volumes stored on disk 960. Similarly, persistence layer 940 includes NVM block manager 944 to control an NVM-based filesystem to manage NVM blocks of NVM hardware 970 used to store columnar data. NVM 936 and NVM hardware 970 represent the same physical hardware and the separate depiction in FIG. 9 is to illustrate a conceptual relationship. Specifically, the relation is that NVM "files" 936 are mapped into the virtual memory 932 when the NVM blocks are loaded, and the contents of the NVM files are stored in NVM 970.

According to some embodiments, NVM block manager 944 facilitates consistent persistent memory management so that the upper database layers can efficiently exploit the persistent NVM space without having to consider allocation, deallocation, data durability, persistent memory leaks, and recovery of data after a restart. NVM block manager 944 is based upon memory-mapped files, thereby leveraging the load/store capabilities of persistent memory while also compatible with other storage technologies (e.g., Solid State Disks).

In some embodiments, the implementation model of NVM block manager 2144 is based on a root directory of the mounted filesystems. The root directory may be the location at which the persistent memory devices (i.e., DIMMs) are mounted. The physical location may be DAX-enabled, which is a Linux feature added for persistent memory storage. If supported, the DAX bypasses the kernel page cache which is usually used to buffer reads/writes into files.

For file-based mappings, the persistent memory space is mapped directly into virtual memory 932. All the NVM-resident blocks are stored under a root directory and, at startup, these blocks are loaded from the root directory as described below. The NVM physical block lifecycle management is aligned with the savepoint logic of the database and is similarly initiated by a savepoint/restart/crash. NVM block manager 944 keeps track of the savepoint version of the system at the time of creation of a new NVM block and uses the information to handle blocks during associated events (e.g., savepoint/restart/crash), which simplifies the corresponding handling of these events by the upper layers.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
a volatile random access memory storing first header data, and storing a first logical array in a first contiguous memory block, with each array position of the first logical array representing a position in a database table and storing a value identifier of a value associated with the position in the database table, and with the first header data indicating a number of bits used to encode the value identifiers and comprising a first pointer to the first contiguous memory block;
a non-volatile random access memory; and
a processing unit to:
determine a memory size associated with the first header data and the first contiguous memory block;
allocate a first memory block of the non-volatile random access memory based on the determined memory size;
determine an address of the non-volatile random access memory associated with the allocated first memory block; and
contiguously write, from the address of the non-volatile random access memory, descriptive information of the first header data including the number of bits, the number of alignment bits, and a binary copy of the first contiguous memory block,
wherein determining the memory size comprises determining the number of alignment bits based on a size of the descriptive information to be written to the non-volatile random access memory and on a desired bit alignment of a start address of the binary copy of the first contiguous memory block in the non-volatile random access memory.

2. A database system according to claim 1, the processing unit further to:
determine the address associated with the allocated first memory block of the non-volatile random access memory;
deserialize the descriptive information written at the address associated with the allocated first memory block of the non-volatile random access memory;
copy the deserialized descriptive information into second header data stored in the volatile random access memory;
determine a pointer to the start address of the binary copy of the first contiguous memory block in the non-volatile random access memory; and
store the pointer in the second header data stored in the volatile random access memory.

3. A database system according to claim 2, wherein determination of the pointer to the start address comprises determination of a next memory address following the descriptive information written at the address associated with the allocated first memory block of the non-volatile random access memory and having the desired bit alignment.

4. A database system according to claim 1, the processing unit further to:
determine the address associated with the allocated first memory block of the non-volatile random access memory;
deserialize the number of bits and the binary copy of the first contiguous memory block written at the address associated with the allocated first memory block of the non-volatile random access memory;
copy the deserialized number of bits and the binary copy of the first contiguous memory block into second header data stored in the volatile random access memory;
determine a pointer to the start address of the binary copy of the first contiguous memory block in the non-volatile random access memory; and
store the pointer in the second header data stored in the volatile random access memory.

5. A database system according to claim 4, wherein determination of the pointer to the start address comprises determination of a next memory address following the number of bits and the binary copy of the first contiguous memory block of the first header data written at the address associated with the allocated first memory block of the non-volatile random access memory and having a desired bit alignment.

6. A database system according to claim 1, the volatile random access memory storing a second logical array in a second contiguous memory block, with each array position of the second logical array representing a position in a database table and storing a dictionary value identified by a value identifier of the first logical array, the first header data including a second pointer to the second contiguous memory block, and
wherein contiguous writing of the descriptive information of the first header data including the number of bits, the number of alignment bits, and the binary copy of the first contiguous memory block at the address of the non-volatile random access memory comprises writing of the descriptive information of the first header data including the number of bits, the number of alignment bits, the binary copy of the first contiguous memory block and a binary copy of the second contiguous memory block at the address of the non-volatile random access memory.

7. A database system according to claim 6, the processing unit further to:
determine the first number of alignment bits based on a size of the descriptive information and on a desired bit alignment of a start address of the binary copy of the first contiguous memory block in the non-volatile random access memory, and
determine the second number of alignment bits based on a size of the binary copy of the first data block and on a desired bit alignment of a start address of the binary copy of the second contiguous memory block in the non-volatile random access memory.

8. A database system according to claim 7, the processing unit further to:
determine the address associated with the allocated first memory block of the non-volatile random access memory;
deserialize the descriptive information written at the address associated with the allocated first memory block of the non-volatile random access memory;
copy the deserialized descriptive information into second header data stored in the volatile random access memory;
determine a first pointer to the start address of the binary copy of the first contiguous memory block in the non-volatile random access memory, and a second pointer to the start address of the binary copy of the second contiguous memory block in the non-volatile random access memory; and
store the first pointer and the second pointer in the second header data stored in the volatile random access memory.

9. A computer-implemented method, comprising:
storing first header data and a first logical array in a volatile random access memory storing, the first logical array stored in a first contiguous memory block of the volatile random access memory, with each array position of the first logical array representing a position in a database table and storing a value identifier of a value associated with the position in the database table, and with the first header data indicating a number of bits used to encode the value identifiers and comprising a first pointer to the first contiguous memory block;
determining a memory size associated with the first header data and the first contiguous memory block;
allocating a first memory block of the non-volatile random access memory based on the determined memory size;
determining an address of the non-volatile random access memory associated with the allocated first memory block; and
contiguously writing, from the address of the non-volatile random access memory, descriptive information of the first header data including the number of bits, the number of alignment bits, and a binary copy of the first contiguous memory block,
wherein determining the memory size comprises determining the number of alignment bits based on a size of the descriptive information to be written to the non-volatile random access memory and on a desired bit alignment of a start address of the binary copy of the first contiguous memory block in the non-volatile random access memory.

10. A method according to claim 9, further comprising:
determining the address associated with the allocated first memory block of the non-volatile random access memory;
deserializing the descriptive information written at the address associated with the allocated first memory block of the non-volatile random access memory;
copying the deserialized descriptive information into second header data stored in the volatile random access memory;
determining a pointer to the start address of the binary copy of the first contiguous memory block in the non-volatile random access memory; and
storing the pointer in the second header data stored in the volatile random access memory,
wherein determining the pointer to the start address comprises determining a next memory address following the descriptive information written at the address associated with the allocated first memory block of the non-volatile random access memory and having the desired bit alignment.

11. A method according to claim 9, further comprising:
determining the address associated with the allocated first memory block of the non-volatile random access memory;
deserializing the number of bits and the binary copy of the first contiguous memory block written at the address associated with the allocated first memory block of the non-volatile random access memory;
copying the deserialized number of bits and the binary copy of the first contiguous memory block into second header data stored in the volatile random access memory;
determining a pointer to the start address of the binary copy of the first contiguous memory block in the non-volatile random access memory; and
storing the pointer in the second header data stored in the volatile random access memory,
wherein determination of the pointer to the start address comprises determination of a next memory address following the number of bits and the binary copy of the first contiguous memory block of the first header data written at the address associated with the allocated first memory block of the non-volatile random access memory and having a desired bit alignment.

12. A method according to claim 9, the volatile random access memory storing a second logical array in a second contiguous memory block, with each array position of the second logical array representing a position in a database table and storing a dictionary value identified by a value identifier of the first logical array, the first header data including a second pointer to the second contiguous memory block,
wherein contiguously writing the descriptive information of the first header data including the number of bits, the number of alignment bits, and the binary copy of the first contiguous memory block at the address of the non-volatile random access memory comprises contiguously writing, from the address of the non-volatile random access memory, descriptive information including the number of bits, a first number of alignment bits, the binary copy of the first contiguous memory block, a second number of alignment bits, and the binary copy of the second contiguous memory block, the method further comprising:
determining the first number of alignment bits based on a size of the descriptive information and on a desired bit alignment of a start address of the binary copy of the first contiguous memory block in the non-volatile random access memory, and
determining the second number of alignment bits based on a size of the binary copy of the first data block and on a desired bit alignment of a start address of the binary copy of the second contiguous memory block in the non-volatile random access memory.

13. A method according to claim 12, further comprising:
determining the address associated with the allocated first memory block of the non-volatile random access memory;

deserializing the descriptive information written at the address associated with the allocated first memory block of the non-volatile random access memory;

copying the deserialized descriptive information into second header data stored in the volatile random access memory;

determining a first pointer to the start address of the binary copy of the first contiguous memory block in the non-volatile random access memory, and a second pointer to the start address of the binary copy of the second contiguous memory block in the non-volatile random access memory; and storing the first pointer and the second pointer in the second header data stored in the volatile random access memory.

14. A non-transitory computer-readable medium storing program code, the program code executable by a computer system to cause to the computer system to:

store first header data and a first logical array in a volatile random access memory storing, the first logical array stored in a first contiguous memory block of the volatile random access memory, with each array position of the first logical array representing a position in a database table and storing a value identifier of a value associated with the position in the database table, and with the first header data indicating a number of bits used to encode the value identifiers and comprising a first pointer to the first contiguous memory block;

determine a memory size associated with the first header data and the first contiguous memory block;

allocate a first memory block of the non-volatile random access memory based on the determined memory size;

determine an address of the non-volatile random access memory associated with the allocated first memory block; and contiguously write, from the address of the non-volatile random access memory, descriptive information of the first header data including the number of bits, the number of alignment bits, and a binary copy of the first contiguous memory block at the address of the non-volatile random access memory, wherein determination of the memory size comprises determination of the number of alignment bits based on a size of the descriptive information to be written to the non-volatile random access memory and on a desired bit alignment of a start address of the binary copy of the first contiguous memory block in the non-volatile random access memory.

15. A medium according to claim 14, the program code executable by a computer system to cause to the computer system to:

determine the address associated with the allocated first memory block of the non-volatile random access memory;

deserialize the number of bits and the binary copy of the first contiguous memory block written at the address associated with the allocated first memory block of the non-volatile random access memory;

copy the deserialized number of bits and the binary copy of the first contiguous memory block into second header data stored in the volatile random access memory;

determine a pointer to the start address of the binary copy of the first contiguous memory block in the non-volatile random access memory; and store the pointer in the second header data stored in the volatile random access memory, wherein determining the pointer to the start address comprises determining a next memory address following the number of bits and the binary copy of the first contiguous memory block of the first header data written at the address associated with the allocated first memory block of the non-volatile random access memory and having a desired bit alignment.

16. A medium according to claim 14, the volatile random access memory storing a second logical array in a second contiguous memory block, with each array position of the second logical array representing a position in a database table and storing a dictionary value identified by a value identifier of the first logical array, the first header data including a second pointer to the second contiguous memory block, wherein contiguously writing the descriptive information of the first header data including the number of bits, the number of alignment bits, and the binary copy of the first contiguous memory block at the address of the non-volatile random access memory comprises contiguously writing, from the address of the non-volatile random access memory, descriptive information including the number of bits, a first number of alignment bits, the binary copy of the first contiguous memory block, a second number of alignment bits, and the binary copy of the second contiguous memory block, and the program code further executable by a computer system to cause to the computer system to:

determine the first number of alignment bits based on a size of the descriptive information and on a desired bit alignment of a start address of the binary copy of the first contiguous memory block in the non-volatile random access memory, and determine the second number of alignment bits based on a size of the binary copy of the first data block and on a desired bit alignment of a start address of the binary copy of the second contiguous memory block in the non-volatile random access memory determine the address associated with the allocated first memory block of the non-volatile random access memory;

deserialize the descriptive information written at the address associated with the allocated first memory block of the non-volatile random access memory;

copy the deserialized descriptive information into second header data stored in the volatile random access memory;

determine a first pointer to the start address of the binary copy of the first contiguous memory block in the non-volatile random access memory, and a second pointer to the start address of the binary copy of the second contiguous memory block in the non-volatile random access memory; and store the first pointer and the second pointer in the second header data stored in the volatile random access memory.

* * * * *